United States Patent [19]
Reynolds

[11] Patent Number: 5,967,272
[45] Date of Patent: Oct. 19, 1999

[54] CLUTCH BRAKE WEAR LIMITER

[75] Inventor: Joseph Reynolds, Climax, Mich.

[73] Assignee: Eaton Corporation, Cleveland, Ohio

[21] Appl. No.: 09/032,641

[22] Filed: Feb. 27, 1998

[51] Int. Cl.[6] .......................... B60K 41/24; F16D 11/00; F16D 13/44
[52] U.S. Cl. .................. 192/13 R; 192/30 W; 192/89.24
[58] Field of Search .............................. 192/13 R, 89.24, 192/98, 110 B, 30 W

[56] References Cited

U.S. PATENT DOCUMENTS

| | | | |
|---|---|---|---|
| 3,912,058 | 10/1975 | Parkins | 192/13 R X |
| 3,942,617 | 3/1976 | Poon | 192/13 R X |
| 4,832,165 | 5/1989 | Nishimura et al. | 192/13 R |
| 5,339,928 | 8/1994 | Deit et al. | 192/30 W X |

*Primary Examiner*—Charles A. Marmor
*Assistant Examiner*—Roger Pang
*Attorney, Agent, or Firm*—Brooks & Kushman PC

[57] ABSTRACT

A transmission bearing cover for limiting wear of a rotatable braking mechanism in a vehicle powertrain having a clutch for releasably coupling an engine to a transmission input shaft includes an annular non-rotatable member disposable about the input shaft and having an annular projection engageable with a non-rotatable clutch release bearing assembly. When the rotatable braking mechanism is substantially worn and the clutch is sufficiently disengaged, the clutch release bearing assembly axially translates to a clutch-braking position and engages the projection rather than the worn braking mechanism to prevent substantial damage to the bearing cover or bearing assembly.

12 Claims, 2 Drawing Sheets

CLUTCH BRAKE WEAR LIMITER

TECHNICAL FIELD

The present invention relates to a method and apparatus for limiting the wear of a clutch brake used in a motor vehicle powertrain.

BACKGROUND ART

A conventional master clutch functions as a releasable coupling between an engine and transmission components in a motor vehicle. Such clutches include a driving disc attached to an output shaft on the engine, and a driven disc attached to an input shaft on the transmission. To engage the clutch, the driving disc and the driven disc are forced into contact with each other, thereby reducing the relative speed difference between the discs until they are coupled through frictional force.

When the transmission is in neutral and the clutch is disengaged after being engaged with the engine running, the inertia of the driven components tends to keep them rotating, with only a gradual decrease in speed due to friction. This residual rotation prolongs the time required to complete a gear shift in the transmission because the driven components must slow down to the correct speed to allow engagement of the next gear. Therefore, after the clutch is fully disengaged, it is desirable to reduce the time required for the driven components to slow down, in the case of a moving upshift, or to stop rotating completely, in the case of a stationary shift.

It is well known in the art to retard rotation of the input shaft by using a clutch brake, which is activated by a clutch release bearing assembly upon sufficient disengagement of the clutch. Such a clutch brake typically has a steel core with friction material on each side of the core. After the friction material is sufficiently worn, however, the steel core causes damage to the clutch release bearing assembly and other surrounding components upon sufficient disengagement of the clutch.

SUMMARY OF THE INVENTION

Accordingly, it is an object of the invention to provide a method and apparatus for limiting wear of a clutch brake in a vehicle powertrain.

Another object of the invention is to provide a method and apparatus which prevent the clutch brake from damaging a clutch release bearing assembly and other surrounding components in the vehicle powertrain.

A more specific object of the invention is to provide a clutch which includes a release bearing assembly having a projection engageable with the transmission bearing cover for limiting wear of the clutch brake and eliminating damage to the clutch release bearing assembly.

Still another more specific object of the invention is to provide a transmission bearing cover having a projection engageable with the clutch release bearing assembly for limiting wear of the clutch brake.

In one embodiment of the present invention, a clutch for use with a vehicle powertrain having a transmission including an input shaft and a bearing cover disposed about the input shaft and a braking mechanism for braking the input shaft comprises a bearing assembly disposable about the input shaft and axially translatable between a clutch-engaged position, a clutch-disengaged position and a clutch-braking position. The bearing assembly engages the braking mechanism when the braking mechanism is not substantially worn and the bearing assembly is in the clutch-braking position. The bearing assembly further has a projection engageable with the bearing cover for limiting wear of the braking mechanism and eliminating damage to either the bearing assembly or the bearing cover. When the braking mechanism is substantially worn and the clutch is sufficiently disengaged, the bearing assembly axially translates to the clutch-braking position and the projection engages the bearing cover such that the bearing assembly is prevented from substantially engaging the rotating braking mechanism.

In an alternate embodiment of the invention, a bearing cover is provided for limiting wear of the braking mechanism. The bearing cover comprises a member cooperable with the transmission and disposable about the input shaft, the member having a projection engageable with the bearing assembly. When the braking mechanism is substantially worn and the clutch is sufficiently disengaged, the bearing assembly axially translates to the clutch-braking position and engages the projection, such that the bearing assembly is prevented from substantially engaging the braking mechanism.

A method for preventing damage caused by a worn clutch brake is also disclosed.

The present invention provides a number of advantages. For example, the present invention limits clutch brake wear to prevent metal-to-metal contact between the worn clutch brake core and the bearing assembly or bearing cover. As such, the present invention eliminates costly repair or replacement of the bearing cover and bearing assembly due to damage caused by contact with a worn clutch brake.

These and other objects, features and advantages of the invention are readily apparent from the following detailed description of the best mode for carrying out the invention when taken in conjunction with the accompanying drawings.

BEST MODES FOR CARRYING OUT THE INVENTION

Figure 1:
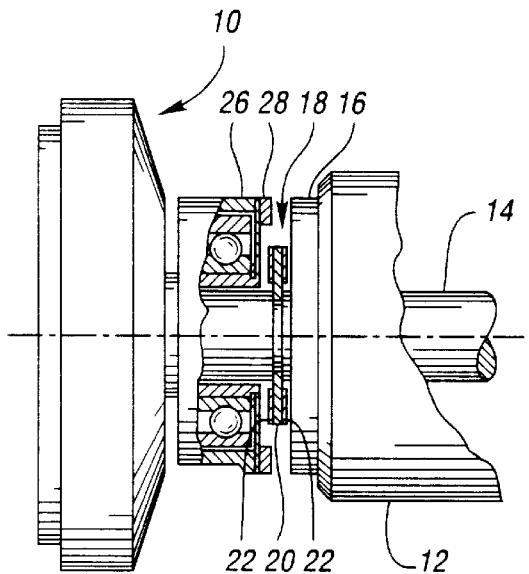
FIG. 1 is a side view of a clutch according to the invention with a portion broken away to show a release bearing assembly with a clutch brake wear limiter.
Figure 2:
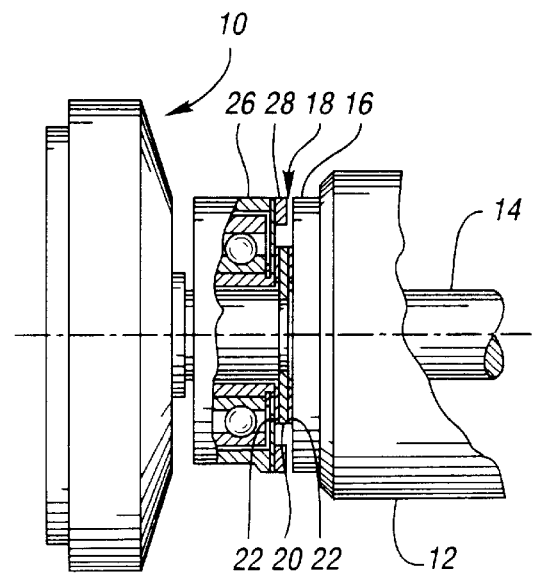
FIG. 2 is a side view of the clutch showing the release bearing assembly in a clutch-braking position engaging a clutch brake.
Figure 3:
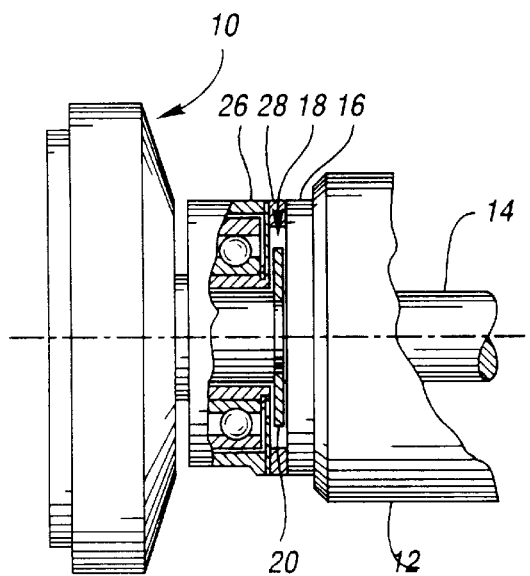
FIG. 3 is a side view of the clutch showing the release bearing assembly in the clutch-braking position with the clutch brake wear limiter engaging a transmission bearing cover.

FIGS. 1 through 3 show a clutch 10 according to the invention for use with a vehicle powertrain having a transmission 12 including an input shaft 14 and a non-rotatable bearing cover 16, and a braking mechanism or clutch brake 18. The clutch brake 18 is rotatably fixed to the input shaft 14, while still being able to move axially along the input shaft. The clutch brake 18 comprises a steel core 20 with a thickness of approximately 0.3 inches. The clutch brake 18 further includes friction material 22 disposed on opposite sides of the core 20, and is provided to aid in gear shifting by retarding rotation of the input shaft 14 as is well known in the art.

The clutch 10 includes a driven disc assembly (not shown) rotatably connected to the input shaft 14, and a driving disc (not shown) rotatably connected to an engine output shaft (not shown). The clutch 10 further includes a non-rotatable clutch release bearing assembly 26 slidably disposed about the input shaft 14. The release bearing assembly 26 may be operated by a conventional clutch pedal with associated linkage (not shown) and is axially translatable between a clutch-engaged position, a clutch-disengaged position and a clutch-braking position.

In the clutch-engaged position shown in FIG. 1, the release bearing assembly 26 cooperates with other components of the clutch 10 to force the driven disc assembly into frictional engagement with the driving disc, thereby causing the input shaft 14 to rotate with the engine output shaft and to deliver power to the transmission 12. In the clutch-disengaged position, the release bearing assembly 26 is pulled away from the driving disc, thereby disengaging the driven disc assembly from the driving disc as is well known in the art. In the clutch-braking position shown in FIG. 2, the release bearing assembly 26 frictionally engages the clutch brake 18 and axially displaces the clutch brake against the transmission bearing cover 16 to retard rotation of the clutch brake and the input shaft 14.

A preferably annular projection 28 extends axially from one end of the release bearing assembly 26, and preferably has a thickness approximately equal to or slightly greater than the thickness of the clutch brake core 20. As shown in FIG. 3, the projection 28 engages the transmission bearing cover 16 when the friction material 22 is substantially worn away from the clutch brake 18, and the release bearing assembly 26 is in the clutch-braking position. Thus, the projection 28 functions as a clutch brake wear limiter by preventing the release bearing assembly 26 from substantially engaging the clutch brake 18 when the friction material 22 is substantially worn away. Furthermore, the projection 28 minimizes any damage to the release bearing assembly 26 or the transmission bearing cover 16 caused by the clutch brake core 20.

Alternatively, the release bearing assembly 26 may have a plurality of projections disposed about its perimeter for engaging the transmission bearing cover 16. Such projections may be of any size and shape sufficient to limit wear of the clutch brake 18, and sufficient to minimize any damage to the release bearing assembly 26 or the transmission bearing cover 16 caused by the clutch brake core 20.

Figure 4:
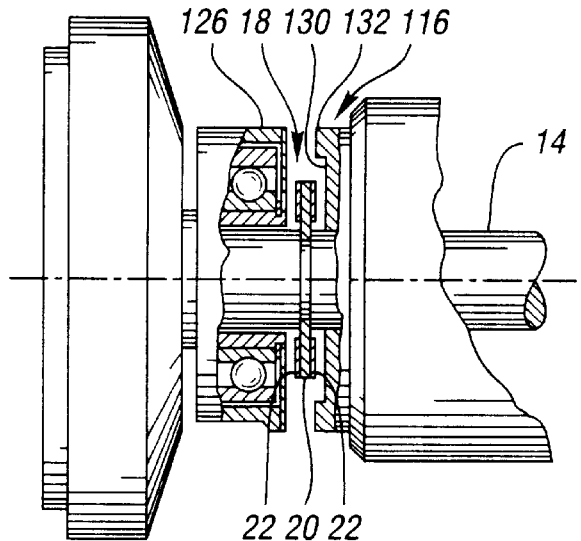
FIG. 4 is a side view of a second embodiment of the transmission bearing cover according to the invention with a portion broken away to show a clutch brake wear limiter.

FIG. 4 shows a second embodiment 116 of the transmission bearing cover according to the invention for use with a vehicle powertrain having the clutch brake 18 and a non-rotatable clutch release bearing assembly 126, which is axially translatable about the input shaft 14 in a manner similar to that described above with respect to the release bearing assembly 26. The bearing cover 116 comprises a non-rotatable annular member 130 disposed about the input shaft 14. A preferably annular projection 132 extends axially from the annular member 130, and preferably has a thickness approximately equal to or slightly greater than the thickness of the clutch brake core 20. The projection 132 engages the release bearing assembly 126 when the friction material 22 is substantially worn away from the clutch brake 18, and the release bearing assembly is in the clutch-braking position. Thus, the projection 132 functions as a clutch brake wear limiter by preventing the release bearing assembly 126 from substantially engaging the clutch brake 18 when the friction material 22 is substantially worn away. Furthermore, the projection 132 minimizes any damage to the release bearing assembly 126 or the transmission bearing cover 116 caused by the clutch brake core 20.

Alternatively, the annular member 130 may have a plurality of projections disposed about its perimeter for engaging the release bearing assembly 126. Such projections may be of any size and shape sufficient to limit wear of the clutch brake 18, and sufficient to minimize any damage to the release bearing assembly 126 or the transmission bearing cover 116 caused by the clutch brake core 20.

Figure 5:
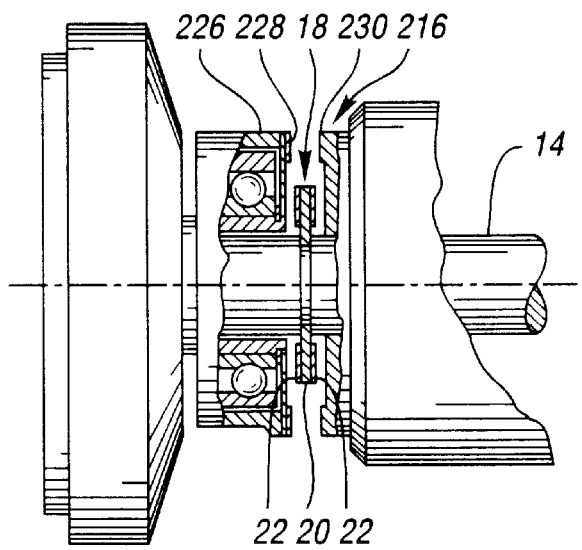
FIG. 5 is a side view of a third embodiment of the transmission bearing cover according to the invention and a third embodiment of the release bearing assembly according to the invention, each with a portion broken away to show a part of a clutch brake wear limiter.

FIG. 5 shows a third embodiment 216 of the non-rotatable transmission bearing cover, according to the invention, and a third embodiment 226 of the non-rotatable clutch release bearing assembly, according to the invention, for use with a vehicle powertrain having the clutch brake 18. Both the bearing assembly 226 and the bearing cover 216 have a projection 228 and 230, respectively, and the projections are engageable with each other to prevent the release bearing assembly from substantially engaging the clutch brake 18 when the friction material 22 is substantially worn away and the release bearing assembly is in the clutch-braking position. Thus, the projections 228 and 230 cooperatively function as a clutch brake wear limiter, and the thickness of the projections 228 and 230 taken together is preferably approximately equal to or slightly greater than the thickness of the clutch brake core 20. Alternatively, the release bearing assembly 226 and the bearing cover 216 may each have a plurality of projections, each of the release bearing assembly projections being engageable with a corresponding projection on the bearing cover.

The method according to the invention can be practiced using any of the apparatuses previously described. The method involves depressing the clutch pedal to axially translate the bearing assembly along the input shaft to the clutch-braking position. The method further involves limiting the axial translation of the bearing assembly to prevent the bearing assembly from engaging or otherwise contacting the clutch brake when the clutch brake is substantially worn and the bearing assembly is in the clutch-braking position. By this method, wear of the clutch brake is limited and damage to the bearing assembly or the transmission bearing cover is prevented.

The invention has been described in an illustrative manner, and it is to be understood that the terminology which has been used is intended to be int he nature of words of description rather than of limitation. Obviously, many modifications and variations of the invention are possible in light of the above teachings. It is, therefore, to be understood that within the scope of the appended claims, the invention may be practiced otherwise than as specifically described.

What is claimed is:

1. A vehicle power train comprising:
   a transmission including an input shaft and a bearing cover disposed about the input shaft;
   a braking mechanism drivably and slidably engaged with the input shaft for braking the input shaft; and
   a clutch for releasably coupling the input shaft of the transmission, the clutch including a bearing assembly disposed about the input shaft and axially translatable between a clutch-engaged position, a clutch-disengaged position and a third position, the bearing assembly contacting the braking mechanism when the braking mechanism is not substantially worn and the bearing assembly is in the third position;

wherein at least one of the group consisting of the bearing cover and the bearing assembly includes a projection, the projection contacting the other of the group consisting of the bearing cover and the bearing assembly when the braking mechanism is substantially worn and the bearing assembly is in the third position, thereby preventing the bearing assembly from substantially engaging the braking mechanism.

2. The vehicle power train of claim 1 wherein the braking mechanism has a core with a predetermined thickness, and the projection has a thickness approximately equal to the core thickness.

3. The vehicle power train of claim 1 wherein the braking mechanism has a core with a predetermined thickness, and the projection has a thickness greater than the core thickness.

4. The vehicle power train of claim 2 wherein the braking mechanism further includes friction material on opposite sides of the core for engaging the bearing assembly and the bearing cover.

5. A clutch for use with a vehicle power train having a transmission including an input shaft and a bearing cover disposed about the input shaft, and a braking mechanism for braking the input shaft, the clutch comprising a bearing assembly disposable about the input shaft and axially translatable between a clutch-engaged position, a clutch-disengaged position and a third position, the bearing assembly being engageable with the braking mechanism when the braking mechanism is not substantially worn and the bearing assembly is in the third position, the bearing assembly further having a projection engageable with the bearing cover for limiting wear of the braking mechanism, wherein when the braking mechanism is substantially worn and the clutch is sufficiently disengaged, the bearing assembly axially translates to the third position and the projection engages the bearing cover such that the bearing assembly is prevented from substantially engaging the braking mechanism.

6. The clutch of claim 5 wherein the projection extends axially from substantially the entire perimeter of the bearing assembly.

7. The clutch of claim 5 wherein the bearing assembly has a plurality of projections engageable with the bearing cover.

8. For use in a vehicle power train having a clutch for releasably coupling an engine to an input shaft of a transmission, and a braking mechanism for braking the input shaft upon disengagement of the clutch, the clutch including a bearing assembly disposed about the input shaft and axially translatable between a clutch-engaged position, a clutch-disengaged position and a third position for engaging the braking mechanism when the braking mechanism is not substantially worn, a bearing cover for limiting wear of the braking mechanism, the bearing cover comprising:

a member disposable about the input shaft and having a projection engageable with the bearing assembly, wherein when the braking mechanism is substantially worn and the clutch is sufficiently disengaged, the bearing assembly axially translates toward the third position and engages the projection such that the bearing assembly is prevented from substantially engaging the braking mechanism.

9. The bearing cover of claim 8 wherein the projection extends axially from substantially the entire perimeter of the member.

10. The bearing cover of claim 8 wherein the member has a plurality of projections engageable with the bearing assembly.

11. A method for preventing damage caused by a worn braking mechanism in a vehicle power train having a clutch for releasably coupling an engine to an input shaft of a transmission, the clutch including a bearing assembly disposed about the input shaft and axially translatable between a clutch-engaged position, a clutch-disengaged position and a third position for engaging the braking mechanism when the braking mechanism is not substantially worn, the method comprising preventing the bearing assembly from engaging the braking mechanism when the braking mechanism is substantially worn and the bearing assembly is in the third position.

12. A method for preventing damage caused by a worn braking mechanism in a vehicle power train having a clutch, the clutch including a bearing assembly disposed about an input shaft, the bearing assembly being axially translatable between a clutch-engaged position, a clutch-disengaged position and a third position for engaging the braking mechanism when the braking mechanism is not substantially worn, the method comprising:

axially translating the bearing assembly beyond the clutch-disengaged position toward the third position, and limiting the axial translation of the bearing assembly to prevent the bearing assembly from engaging the braking mechanism when the braking mechanism is substantially worn.

* * * * *